(12) United States Patent
Mizes et al.

(10) Patent No.: US 10,291,816 B2
(45) Date of Patent: *May 14, 2019

(54) SYSTEM AND METHOD FOR IDENTIFICATION AND CONTROL OF Z-AXIS PRINTHEAD POSITION IN A THREE-DIMENSIONAL OBJECT PRINTER

(71) Applicant: Xerox Corporation, Norwalk, CT (US)

(72) Inventors: Howard A. Mizes, Pittsford, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 813 days.

This patent is subject to a terminal disclaimer.

(21) Appl. No.: 14/603,710

(22) Filed: Jan. 23, 2015

(65) Prior Publication Data

US 2016/0214323 A1    Jul. 28, 2016

(51) Int. Cl.
*B29C 67/00* (2017.01)
*H04N 1/40* (2006.01)
*B29C 64/393* (2017.01)
*B41J 25/308* (2006.01)
*B33Y 10/00* (2015.01)
*B33Y 30/00* (2015.01)
*B33Y 50/02* (2015.01)

(52) U.S. Cl.
CPC ............ *H04N 1/40* (2013.01); *B29C 64/393* (2017.08); *B33Y 10/00* (2014.12); *B33Y 30/00* (2014.12); *B33Y 50/02* (2014.12)

(58) Field of Classification Search
CPC ................... B29C 67/0059; B29C 67/0088
See application file for complete search history.

(56) References Cited

U.S. PATENT DOCUMENTS

| 6,508,971 | B2 * | 1/2003 | Leyden | B29C 41/12 264/308 |
| 7,798,587 | B2 * | 9/2010 | Mizes | B41J 15/04 347/16 |
| 8,485,634 | B2 | 7/2013 | Mizes et al. | |
| 8,506,038 | B2 * | 8/2013 | Mizes | B41J 2/2135 347/15 |
| 8,585,173 | B2 * | 11/2013 | Mizes | G06K 15/027 347/14 |
| 8,602,518 | B2 | 12/2013 | Mizes et al. | |
| 8,651,615 | B2 * | 2/2014 | Elliot | B41J 2/2146 347/14 |
| 2005/0280665 | A1 * | 12/2005 | Flotats | B41J 11/0035 347/8 |
| 2006/0061613 | A1 * | 3/2006 | Fienup | B41J 2/16532 347/19 |
| 2006/0111807 | A1 * | 5/2006 | Gothait | B29C 67/0059 700/119 |

(Continued)

*Primary Examiner* — Atul P. Khare

(74) *Attorney, Agent, or Firm* — Maginot Moore & Beck LLP

(57) ABSTRACT

A method of operating a three-dimensional object printer includes generation of a printed predetermined test pattern on a substrate in the printer with a plurality of ejectors in a printhead. An image sensor generates image data of the printed test pattern and a controller identifies a z-axis distance between the printhead and the substrate that receives the test pattern with reference to an identified dispersion between cross-process direction distances separating printed marks in the test pattern.

9 Claims, 9 Drawing Sheets

(56) References Cited

U.S. PATENT DOCUMENTS

| | | | |
|---|---|---|---|
| 2009/0085952 A1* | 4/2009 | Yamazaki | B41J 2/2142 347/19 |
| 2010/0245455 A1* | 9/2010 | Mizes | B41J 2/2135 347/19 |
| 2010/0303281 A1* | 12/2010 | Wu | B41J 2/2142 382/100 |
| 2011/0242187 A1 | 10/2011 | Mongeon et al. | |
| 2011/0279505 A1 | 11/2011 | Shin et al. | |
| 2013/0201245 A1* | 8/2013 | Donaldson | B41J 2/2135 347/19 |
| 2013/0328227 A1* | 12/2013 | McKinnon | B29C 67/0088 264/40.1 |
| 2014/0022298 A1* | 1/2014 | Li | B41J 11/0095 347/19 |

\* cited by examiner

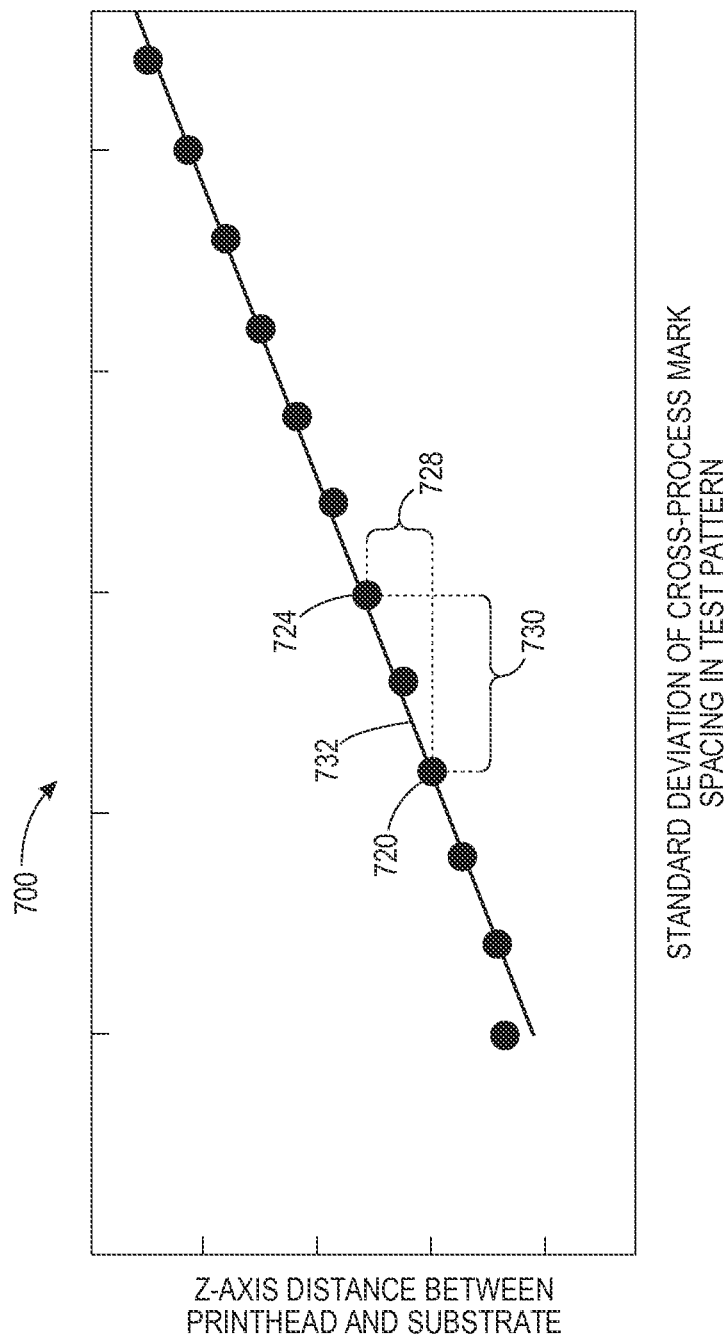

SYSTEM AND METHOD FOR IDENTIFICATION AND CONTROL OF Z-AXIS PRINTHEAD POSITION IN A THREE-DIMENSIONAL OBJECT PRINTER

TECHNICAL FIELD

This disclosure is directed to three-dimensional object printing systems and, more particularly, to systems and methods of identification and control of the relative position of printheads with a support member or upper layer of a printed object along a z-axis.

BACKGROUND

Three-dimensional printing, also known as additive manufacturing, is a process of making a three-dimensional solid object from a digital model of virtually any shape. Many three-dimensional printing technologies use an additive process in which successive layers of the part are built on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

During production of three-dimensional printed objects with an inkjet printer, the printer adjusts the relative position of one or more printheads within a comparatively narrow range distances from a surface of a substrate that receives the build material. In some instances the substrate is a support member in the three-dimensional object printer, while in other instances the substrate is an upper layer of an object that is formed in the three-dimensional object printer. The printer adjusts the relative distance between the printheads and the support member that holds the object to enable the printheads to print additional layers of material on an upper layer of the object as the printer forms the object from a series of layers of a build material. The printer controls the position of the printheads to ensure that the printheads are close enough to a surface of the substrate for precise and accurate placement of drops of the build material. The printer also controls the position of the printheads to maintain sufficient separation between the printhead and the substrate, which prevents the printed object from contacting the printhead which would result in clogging of the nozzles preventing the future firing or causing misfiring of the jets in addition to damage of the object being built.

During operation of a three-dimensional object printer, at least one of the support member or the printheads moves along the z-axis during the object printing process to accommodate the printed object that extends from the support member toward the printheads. Accurate measurements of the distance between the support member or upper layer of the object and the printheads enable the printheads to operate with improved precision and reliability. Consequently, improved systems and methods for identifying and controlling the separation between printheads and support members or objects in a three-dimensional object printer would be beneficial.

SUMMARY

In one embodiment, a method of operating a three-dimensional object printer to identify a z-axis distance between a printhead and a substrate has been developed. The method includes operating a plurality of ejectors in a first printhead to form a first predetermined test pattern having a first plurality of marks arranged in a cross-process direction on a surface of a substrate, generating with an image sensor image data of the first predetermined test pattern on the substrate, identifying with a controller a dispersion of cross-process direction distances between marks in the first plurality of marks of the first predetermined test pattern with reference to the generated image data, identifying with the controller a first z-axis distance between the first printhead and the substrate with reference to the identified dispersion, the z-axis being perpendicular to the surface of the substrate, and operating with the controller at least one actuator to move at least one of the first printhead and the substrate along the z-axis in response to the identified first z-axis distance being outside of a predetermined z-axis distance range.

In another embodiment, a method of operating a three-dimensional object printer to generate a profile corresponding to dispersions in printed test patterns and a z-axis distance between a printhead and substrate has been developed. The method includes operating a plurality of ejectors in a first printhead to form a first predetermined test pattern having a first plurality of marks arranged in a cross-process direction on a surface of a substrate at a first z-axis distance between the first printhead and the substrate, the z-axis being perpendicular to the surface of the substrate, generating with an image sensor first image data of the first predetermined test pattern on the substrate, identifying with a controller a first dispersion of cross-process direction distances between marks in the first plurality of marks of the first predetermined test pattern with reference to the first generated image data, operating an actuator to move at least one of the first printhead and the substrate along the z-axis by a predetermined offset distance to separate the first printhead and the substrate by a second z-axis distance, operating the plurality of ejectors in the first printhead to form a second predetermined test pattern having a second plurality of marks arranged in the cross-process direction on the surface of the substrate at the second z-axis distance between the first printhead and the substrate, generating with the image sensor second image data of the second predetermined test pattern on the substrate, identifying with the controller a second dispersion of cross-process direction distances between marks in the second plurality of marks of the second predetermined test pattern with reference to the second generated image data, generating with the controller a profile for the first printhead with reference to the first dispersion, the second dispersion, and the predetermined offset distance, the profile including a relationship between a plurality of dispersions of cross-process direction distances between marks in printed test patterns and corresponding z-axis distances between the first printhead and the substrate, and storing the profile in a memory for use in identification of the z-axis distance between the first printhead and the substrate during a printing operation.

In another embodiment, a three-dimensional object printer that is configured to identify a z-axis distance between a printhead and a substrate has been developed. The printer includes a first printhead having a plurality of ejectors, a support member having a surface configured to receive material ejected from the plurality of ejectors in the first printhead, at least one actuator operatively connected to the first printhead or the support member, an image sensor configured to generate image data of the surface of the support member, and a controller operatively connected to the first printhead, the at least one actuator, and the image sensor. The controller is configured to operate the plurality of ejectors in the first printhead to form a first predetermined test pattern having a first plurality of marks arranged in a cross-process direction on the surface of the support member, generate image data of the first predetermined test pattern with the image sensor, identify a dispersion of cross-process direction distances between marks in the first plurality of marks of the first predetermined test pattern with reference to the image data, identify a first z-axis distance between the first printhead and the surface of the support member with reference to the identified dispersion, the z-axis being perpendicular to the surface of the support member, and operate the at least one actuator to move at least one of the first printhead and the support member along the z-axis in response to the identified first z-axis distance being outside of a predetermined z-axis distance range.

BRIEF DESCRIPTION OF THE DRAWINGS

The foregoing aspects and other features of an apparatus or printer that identifies z-direction distances between one or more printheads and a substrate during operation are explained in the following description, taken in connection with the accompanying drawings.

FIG. 7 is a graph depicting a relationship between dispersions in the cross-process direction positions of drops ejected from a printhead on a surface of a substrate and different z-axis distances between the printhead and the substrate.

DETAILED DESCRIPTION

Figure 1A:
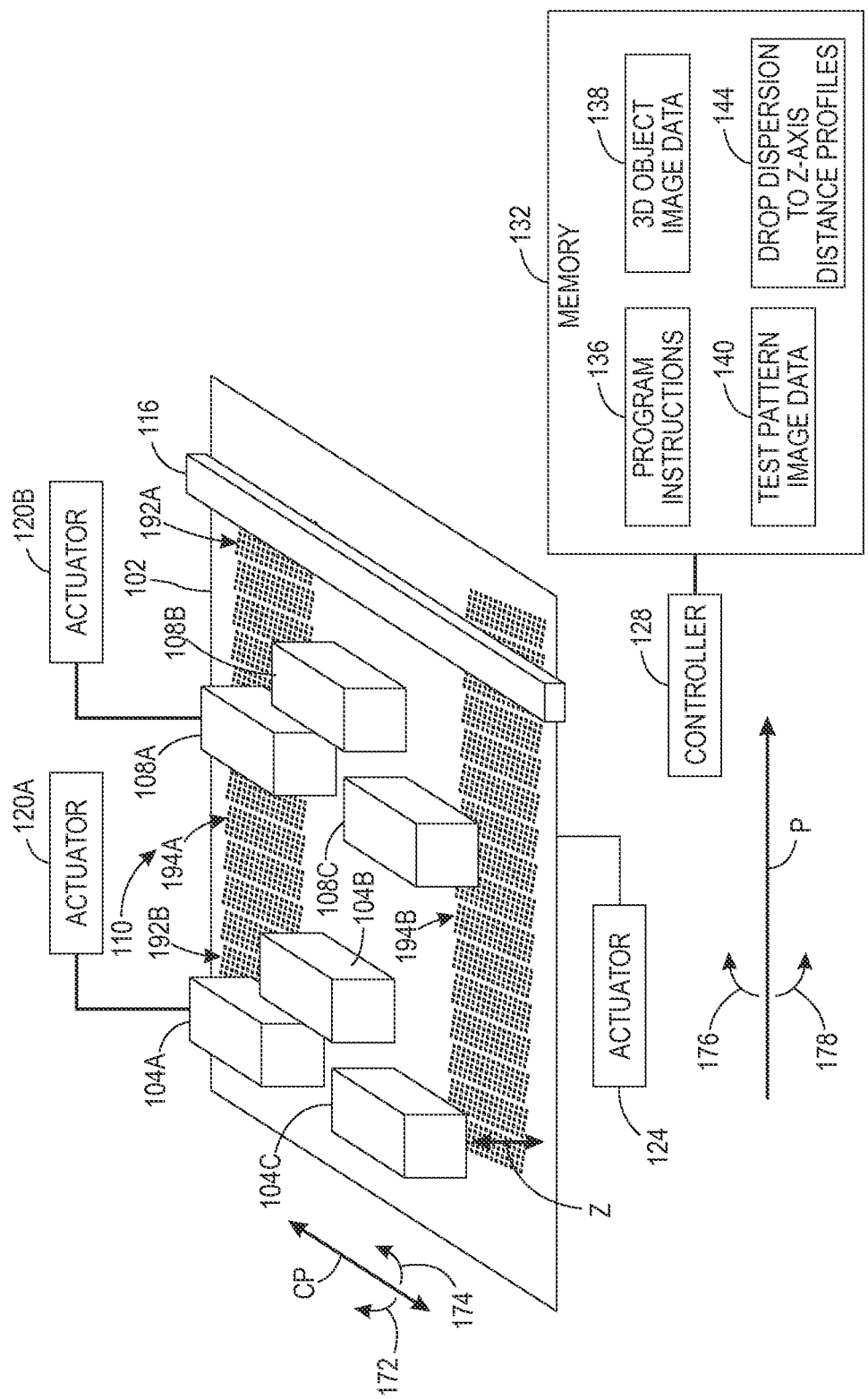
FIG. 1A is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in one or more printheads and subsequently hardened into a solid material that forms an object through an additive three-dimensional object printing process. In some three-dimensional object printer embodiments, multiple forms of build material are used to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multi-color patterns on the surface of the object.

As used herein, the term "support material" refers to another material that is ejected from printheads during a three-dimensional object printing process to stabilize the object that is formed from the build materials. For example, as the three-dimensional object printer applies layers of the build material to form the object, at least one printhead in the printer also ejects layers of the support material that engage portions of the object. The support material holds one or more sections of the build material in place before the object constructed with the build material is a complete object and supported because it is a single object. A simple example of the use of support material includes construction of a cane using the three-dimensional object printer. The arched part of the cane is at the top of the object, and the support material provides support for the downward pointing part of the handle prior to completion of the top of the arch in the cane. The support material also prevents newly formed features from breaking before sufficient build material is present to hold the object together, and prevents portions of the build material that have not fully solidified from flowing out of position before the hardening process is completed. Examples of support material include, but are not limited to, waxy materials that provide support to the object during the printing process and that can be easily removed from the object after the printing process is completed.

As used herein, the term "process direction" refers to a direction of movement of a support member past one or more printheads during a three-dimensional object formation process. The support member holds the three-dimensional object and accompanying support material and building material during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material and support material over a two-dimensional planar region. During a three-dimensional object printing process, successive layers of build material and support material that are formed from the registered printheads form a three-dimensional object.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material and support material. As the ejectors in the printheads form each layer of build material and support material, the printer adjusts the z-axis separation between the printheads and the uppermost layer to maintain a substantially constant distance between the printheads and the uppermost layer of the object during the printing operation. In many three-dimensional object printer embodiments, the z-axis separation between the printheads and the uppermost layer of printed material is maintained within comparatively narrow tolerances to enable consistent placement and control of the ejected drops of build material and support material. In some embodiments, the support member moves away from the printheads during the printing operation to maintain the z-axis separation, while in other embodiments the printheads move away from the partially printed object and support member to maintain the z-axis separation.

As used herein, the term "dispersion" refers to any statistical measurement corresponding to a difference between the relative cross-process direction locations of printed marks in a printed test pattern from a printhead in the printer compared to the cross-process direction locations of the printed marks in predetermined test pattern. As used herein, the term "mark" refers to a printed pattern of one or more drops that are formed by a single ejector in a printhead and arranged the process direction axis. A test pattern is formed from an arrangement of marks using multiple ejectors in the printhead. Non-limiting examples of dispersion statistics for marks that are printed in the test pattern include the standard deviation, variance, mean absolute deviation, range, interquartile range, and the like. For example, a predetermined test pattern includes multiple rows of printed marks that are formed with uniform cross-process direction distances between adjacent marks in each row. A printhead with ejectors that eject drops of the material in parallel with the z-axis forms the predetermined test pattern with no dispersion or minimal dispersion. However, the practical embodiments of printheads in the printer include at least some ejectors that eject drops of material at an angle that produces differences between the cross-process direction distances between the printed marks in the test pattern. As described in more detail below, the printer identifies the z-axis distance between different printheads and a substrate in the printer with reference to an identified level of dispersion in the cross-process direction locations of printed marks in test patterns.

Figure 1B:
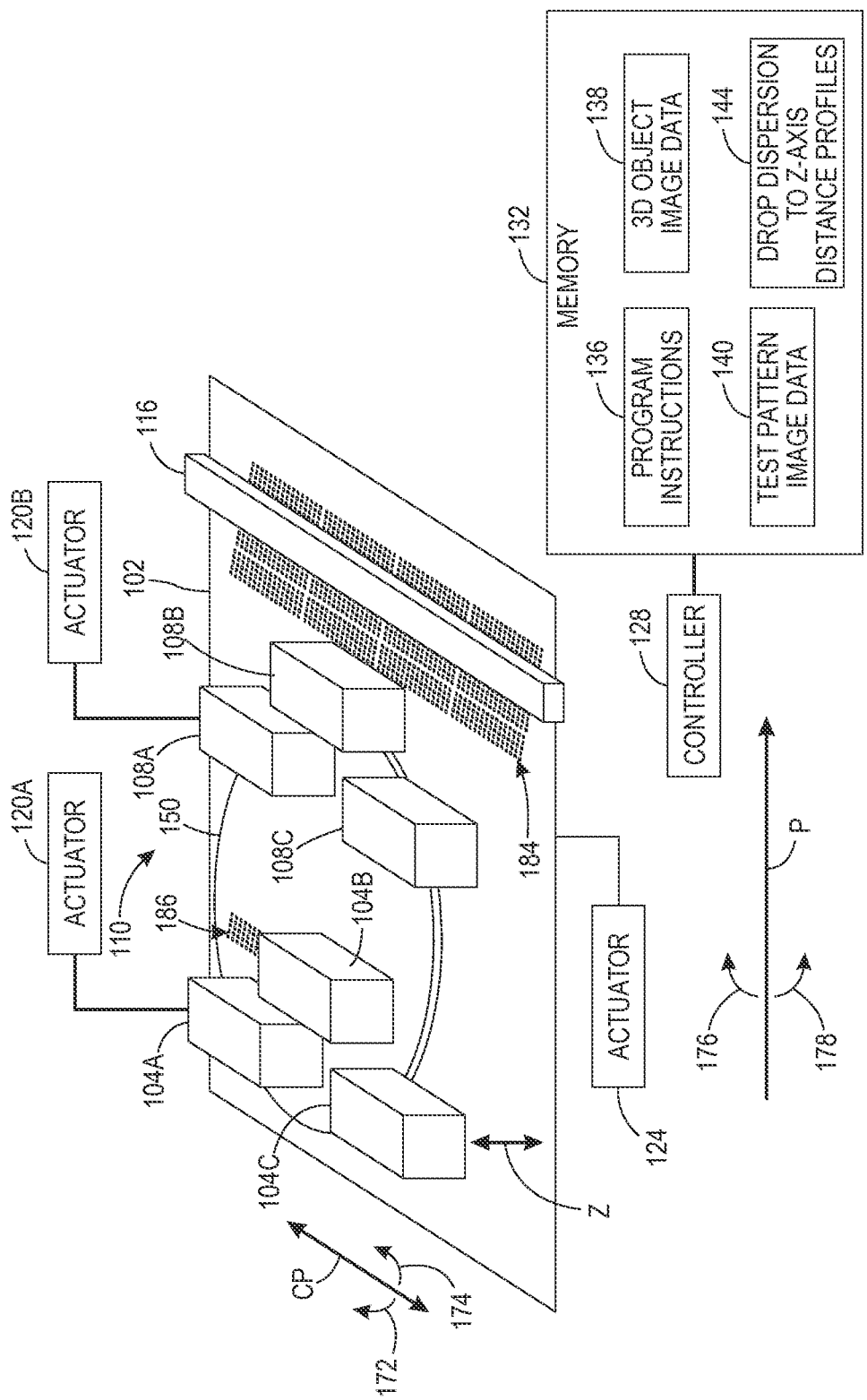
FIG. 1B is a diagram of the three-dimensional object printer of FIG. 1A during an object printing operation.

FIG. 1A and FIG. 1B depict a three-dimensional object printer 100 that is configured to identify the z-axis distance between one or more printheads and a substrate in the printer 100. The printer 100 includes a support member 102, a first printhead array including printheads 104A-104C, a second printhead array including printheads 108A-108C, printhead array actuators 120A and 120B, support member actuator 124, an image sensor 116, a controller 128, and a memory 132. In one configuration, the printhead arrays 104A-104C and 108A-108C emit two different types of build material to form three-dimensional printed objects with two different types of build material. In another configuration, one printhead array emits a build material and the other printhead array emits a support material to form three-dimensional printed objects. Alternative printer embodiments include a different number of printhead arrays or a different number of printheads in each printhead array.

In the printer 100, the support member 102 is a planar member, such as a metal plate, that moves in a process direction P. The printhead arrays 104A-104C and 108A-108C and image sensor 116 form a print zone 110. The support member 102 carries any previously formed layers of the support material and build material through the print zone 110 in the process direction P. During the printing operation, the support member 102 moves in a predetermined process direction path P that passes the printheads multiple times to form successive layers of a three-dimensional printed object, such as the object 150 that is depicted in FIG. 1B. The printheads 104A-104C and 108A-108C also eject drops of material to form predetermined test patterns, such as the test patterns 192A-192B and 194A-194B depicted in FIG. 1A and the test patterns 184 and 186 depicted in FIG. 1B. In some embodiments, multiple members similar to the member 102 pass the print zone 110 in a carousel or similar configuration. In the printer 100, one or more actuators move the member 102 through the print zone 110 in the process direction P. In other embodiments, the actuators 120A and 120B or other actuators move the printheads 104A-104C and 108A-108C, respectively, along the process direction P to form the printed object on the support member 102.

In the printer 100, an actuator 124 also moves the support member 102 along the z-direction axis (z) away from the printheads in the print zone 110 after application of each layer of material to the support member. In some embodiments, the actuator 124 or other actuators that are operatively connected to the support member 102 are configured to adjust an angle of tilt of the support member 102 about the cross-process direction axis CP (tilt arrows 172 and 174) and the process direction axis P (tilt arrows 176 and 178). In another configuration, the actuators 120A and 120B move the printhead arrays 104A-104C and 108A-108C, respectively, upwards along the z-axis to maintain the separation between the printheads and a printed object. In the printer 100, the actuators 124 and 120A-120B are electromechanical actuators such as stepper motors that receive control signals from the controller 128 to move the support member 102 or printhead arrays 104A-104C and 108A-108C by predetermined distances along the z-axis. The illustrative embodiment of the printer 100 includes actuators that adjust the z-axis positions of both the support member 102 and the printhead arrays 104A-104C and 108A-108C, but alternative printer embodiments include actuators operatively connected to only the support member 102 or only to the printheads. The print zone 110 forms an additional layer to the three-dimensional printed object or objects on each member during each circuit through the path to form multiple sets of three-dimensional objects in parallel.

The printhead arrays including the printheads 104A-104C and 108A-108C that eject material toward the support member 102 to form layers of a three-dimensional printed object, such as the object 150 that is depicted in FIG. 1B. Each of the printheads 104A-104C and 108A-108C includes a plurality of ejectors that eject liquefied drops of a build material or support material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. Each of the printheads 104A-104C and 108A-108C includes a two-dimensional array of the ejectors, with an exemplary printhead embodiment including 880 ejectors. During operation, the controller 128 controls the generation of the electrical firing signals to operate selected ejectors at different times to form each layer of the build material for the object. As described in more detail below, the controller 128 also generates firing signals for the ejectors in the printheads 104A-104C and 108A-108C to print test patterns that are used to identify a distance along the z-axis between each printhead and a substrate in the print zone 110. The substrate can be the surface of the support member 102 or an upper layer of a three-dimensional printed substrate formed on the support member 102.

While FIG. 1A and FIG. 1B depict two printhead arrays that eject drops of the build material, alternative embodiments can include three or more printhead arrays that form printed objects with additional build materials. Another embodiment includes only a single printhead array. While the printhead arrays 104A-104C, 108A-108C are each depicted as including three printheads, alternative configurations can include few printheads or a greater number of printheads to accommodate print zones with different sizes in the cross-process direction. Additionally, in rasterized three-dimensional object printer embodiments, one or more printheads move along the cross-process direction axis CP and optionally the process direction axis P during printing operations.

The image sensor 116 includes an array of photodetectors that is arranged across the print zone 110 in the cross-process direction CP is configured to generate digitized image data that corresponds to light reflected from the build material and support material that is formed on the member 102. In one embodiment, the photodetectors generate gray scale 8-bit image data with a total of 256 (0 to 255) levels that correspond to a level of reflected light that each photodetector receiver from the top-most layer of printed support material and printed build material. In other embodiments, the image sensor 116 incorporates multispectral photodetector elements such as red, green, blue (RGB) sensor elements. During operation, the image sensor 116 generates multiple image scanlines that correspond to printed patterns of material drops including printed test patterns formed on the support member 102 or on a substrate that is formed from layers of build material or support material. As the support member 102 moves past the image sensor 116, the image sensor 116 generates two-dimensional scanned image data from a series of the scanlines. The controller 128 receives the scanned image data and performs further processing of the scanned image data to identify the z-axis direction distances between the printheads and the substrate with reference to scanned image date of printed test patterns.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to the actuator 124 that controls the movement of the support member 102 and the actuators 120A and 120B that control the z-axis movement of the printhead arrays 104A-104C and 108A-108C. The controller 128 is also operatively connected to the printhead arrays 104A-104C and 108A-108C, the image sensor 116, and a memory 132.

In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores programmed instructions 136, 3D object image data 138, test pattern data 140, and a drop dispersion to z-axis distance profile 144 associated with each of the printheads 104A-104C and 108A-108C. The controller 128 executes the stored program instructions 136 to operate the components in the printer 100 to both form a three-dimensional printed object, such as the object 150 and to print test patterns that identify z-axis direction distances between the printheads and a substrate in the print zone 110. The controller 128 also generates the drop dispersion to z-axis distance profiles for the printheads 104A-104C and 108A-108C as described in more detail below in the process 300. In some configurations, the controller 128 also identifies an angle of tilt away from the z-axis of the surface of the support member 102 or another substrate in the print zone 110. The 3D object image data 138 include, for example, a plurality of two-dimensional image data patterns that correspond to each layer of build material and support material that the printer 100 forms during the three-dimensional object printing process. The controller 128 ejects drops of material from the printheads 104A-104C and 108A-108C with reference to each set of two-dimensional image data to form each layer of the object 150. The memory 132 also stores test pattern data 140 that correspond to predetermined patterns of marks that the ejectors in the printheads 104A-104C and 108A-108C form on substrates in the print zone 110.

FIG. 1B depicts the printer 100 during a three-dimensional object printing operation. In FIG. 1B, the printheads 104A-104C and 108A-108C form a three-dimensional printed object 150. The support member 102 includes a margin region that is configured to receive additional printed test patterns 184 from some or all of the printheads 104A-104C and 108A-108C. In the embodiment of FIG. 1B, the upper surface of the printed object 150 also serves as a substrate that receives a printed test pattern 186 from the printhead 104A. The image sensor 116 generates image data that include discernible printed marks in the test pattern 186 when the uppermost layer or layers of the object 150 is formed from an optically distinct material, such as a build material with a different color or support material that is ejected from the printheads 108A-108C. In other configurations, the printheads 104A-104C and 108A-108C form structures from two different build materials or a build material and support material to form substrate structures that receives printed test patterns and that have a z-axis height that is similar to the height of the object 150. The controller 128 uses the substrate structures to identify the z-axis distance between one or more of the printheads and the uppermost layer of the object 150.

Figure 2:
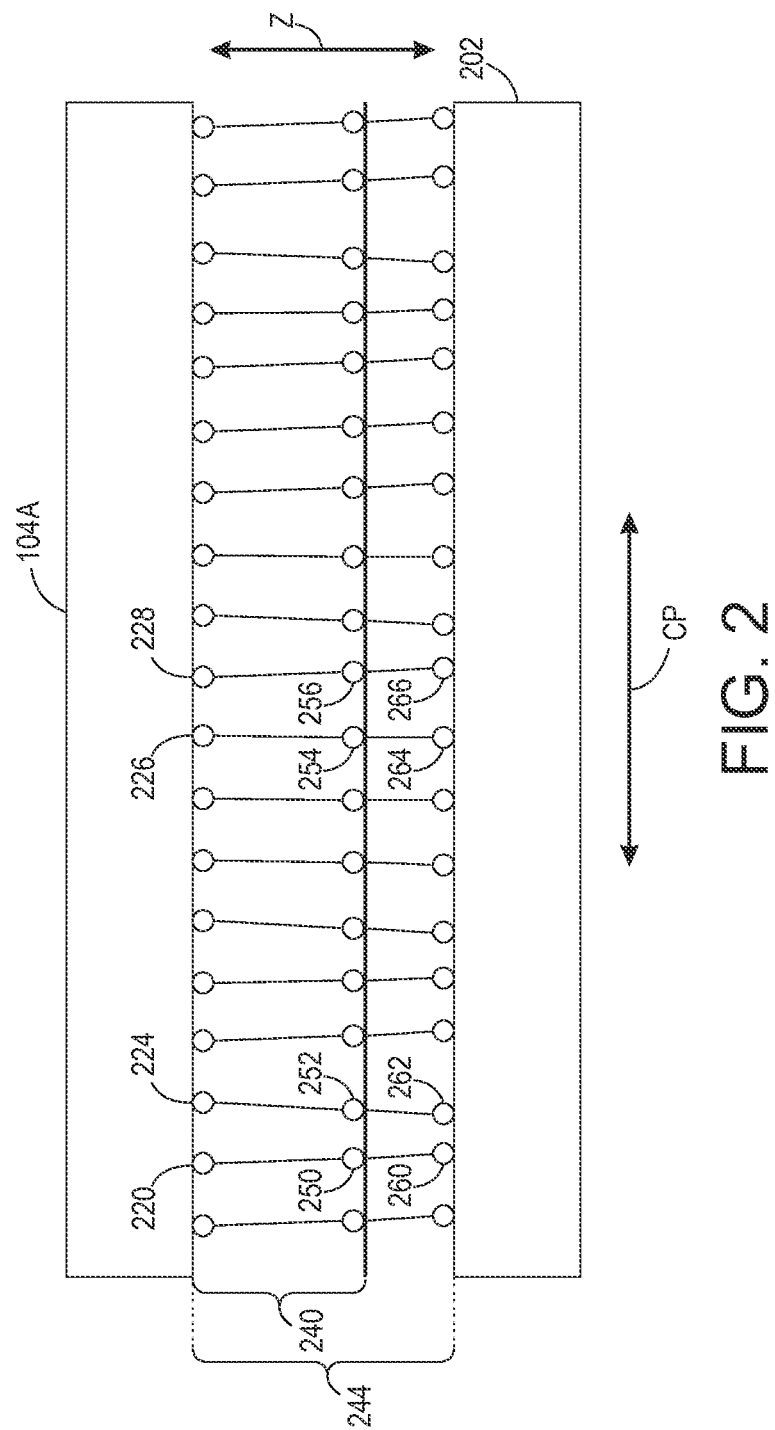
FIG. 2 is a diagram depicting an illustrative distribution of drops that are ejected from a printhead onto a substrate at different z-axis distances between the printhead and substrate.

FIG. 2 depicts the printhead 104A and the substrate 202 in a first z-axis direction position 240 and a second z-axis position 244. As described above, the substrate 202 can be the surface of the support member 102 or upper surface of a printed structure that is formed on the support member 102. In the illustrative example of FIG. 2 the first z-axis direction position 240 places the printhead 104A and substrate 202 closer together along the z-axis compared to the second position 244, but the in another configuration the first position places the printhead 104A and substrate 202 at a larger z-axis distance than the second position. In the configuration of FIG. 2, the controller 128 operates the actuator 124 to move the substrate along the z-axis between the first position 240 and second position 244, while in other embodiments the actuator 120A moves the printhead 104A or the actuators 124 and 120A move both the substrate 202 and printhead 104A, respectively, along the z-axis.

Figure 6:
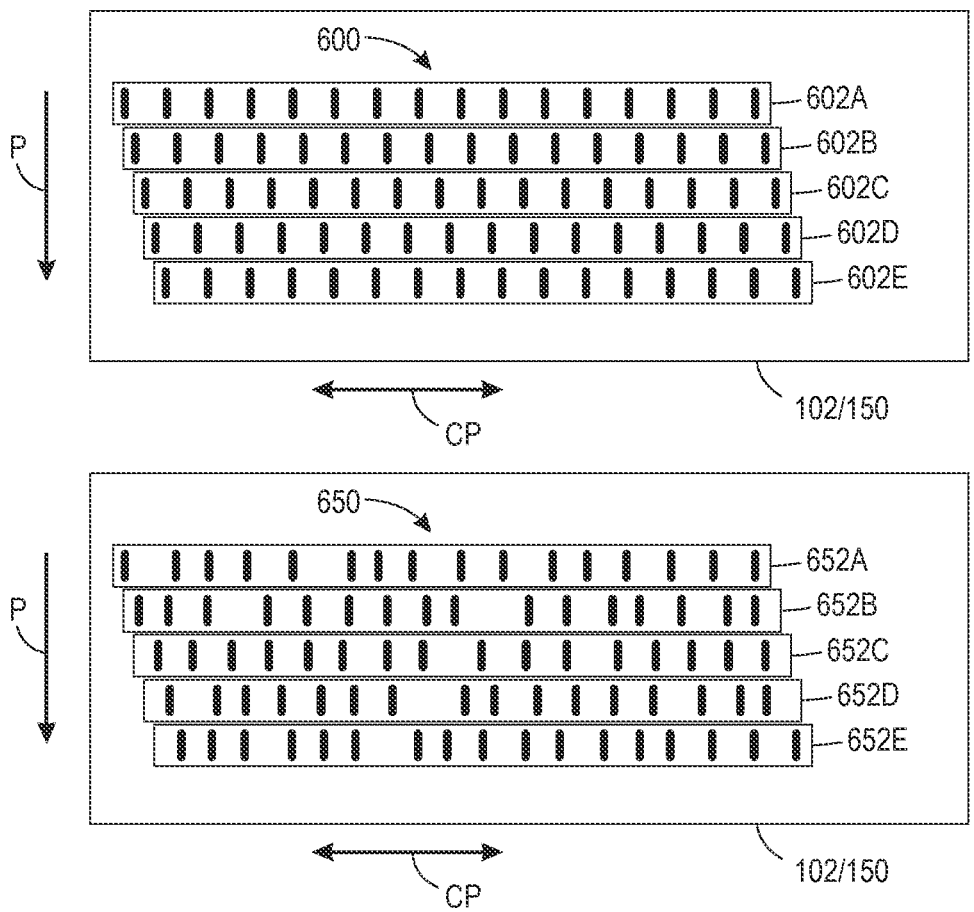
FIG. 6 is an illustrative example of a predetermined test pattern that includes printed marks formed in a cross-process direction.

The printhead 104A includes a plurality of ejectors that are arranged along the cross-process direction axis CP. In some embodiments, the printhead 104A includes diagonal arrangements of ejectors that are staggered across the face of the printhead 104A in a two-dimensional arrangement. As described above, the controller 128 only operates a portion of the ejectors in the printhead 104 to form a single set of marks in a row set of the test pattern. FIG. 2 depicts only a subset of ejectors in the printhead 104A that eject the drops to form a single row set and the printhead 104A includes four ejectors separating each of the adjacent activated ejectors in the cross-process direction CP to form the test pattern 600 of FIG. 6. For example, in FIG. 2 the ejectors 220 and 224 form adjacent marks in one row of a printed test pattern but four additional ejectors separate the ejectors 220 and 224 in the cross-process direction. The controller 128 operates the intermediate ejectors to form other row sets in the predetermined test pattern 600. In different test pattern configurations, the controller 128 operates ejectors to form marks in a single row set with at least one ejector positioned between the activated ejectors in the cross-process direction.

Figure 3:
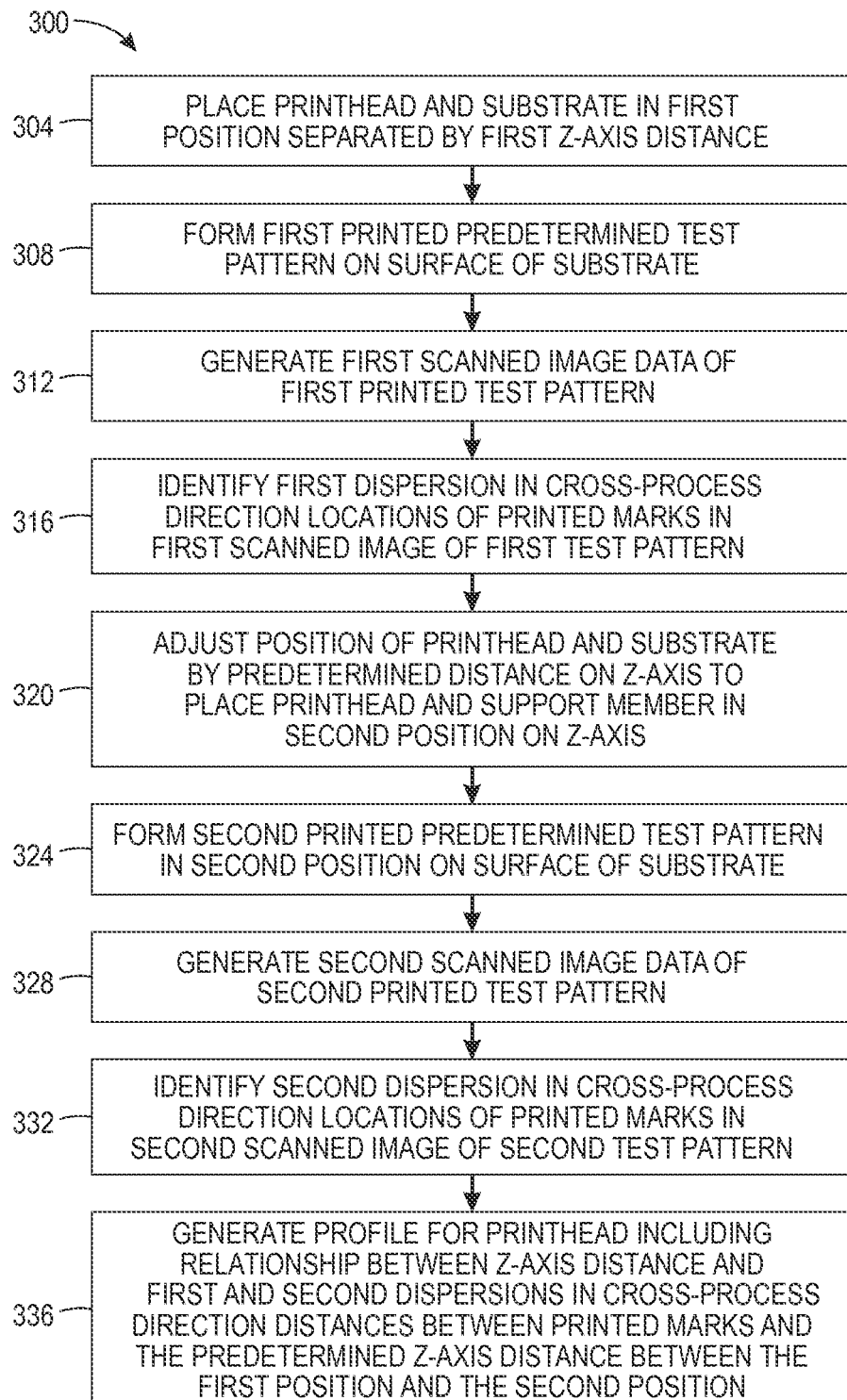
FIG. 3 is a block diagram of a process for generating a profile for a printhead in a three-dimensional object printer that includes a relationship between z-axis distances of the printhead from a substrate and dispersions in the cross-process direction positions of drops ejected from the printhead at the different z-axis distances.

FIG. 3 depicts a block diagram of a process 300 for generation of a profile between the z-axis distance between a printhead and a substrate and a level of dispersion of drop placement along the cross-process direction from a printhead in a three-dimensional object printer. In the description below, a reference to the process 300 performing an action or function refers to the operation of a controller in a printer to execute stored program instructions to perform the function or action with other components in the printer. The process 300 is described in conjunction with the printer 100 and FIG. 1A-FIG. 1B, FIG. 2, FIG. 6, and FIG. 7 for illustrative purposes.

Process 300 begins as the printer 100 places a printhead and the substrate in a first position with a first distance of separation along the z-axis (block 304). For example, the controller 128 operates one or both of the actuators 120A and 124 to place the printhead 104A and a substrate in a first position along the z-axis. As described above, the substrate is either the support member 102 or an upper surface of a build material or support material structure that forms a print substrate. For example, in the printer 100 the controller 128 optionally operates the printheads 108A-108C to form a structure of a second build material or support material having a uniform substrate surface that is optically distinct from the material that is ejected from the printhead 104A. The controller 128 forms the printed test pattern on the surface of the structure instead of the surface of the support member in some configurations.

The process 300 continues as the controller 128 operates the printhead 104A to form a first predetermined test pattern on the surface of the substrate (block 308). The controller 128 generates firing signals for the ejectors in the printhead 104A to form the predetermined test pattern with a plurality of row sets. As used herein, the term "row set" refers to a plurality of printed marks that a printer forms on the surface of the substrate in a predetermined arrangement extending in the cross-process direction. A row set includes at least one set of the printed marks arranged in a single "row" along the cross-process direction, although some test patterns include row sets with multiple rows of the printed marks that are formed as a set of distinct marks extending along the process direction. The printer 100 forms multiple printed rows in some row sets to reduce the effects of random cross-process material drop placement errors during identification of the dispersion in the cross-process direction locations of marks in the printed test pattern. The printed test pattern 600 in FIG. 6 includes five row sets 602A-602E that each include a single row of marks arranged along the cross-process direction axis CP. The controller 128 operates only a portion of the ejectors in the printhead to form each row set in the test pattern. The test pattern 600 includes five row sets because the controller 128 forms adjacent marks in each row set using a set of ejectors in the printhead 104A where four intermediate ejectors lie between each pair of ejectors that form adjacent marks in the row set. In some embodiments, the controller 128 forms a test pattern that includes multiple instances of the test pattern 600 or another similar test pattern in different regions of the substrate surface. In other test pattern embodiments, the row sets include multiple rows of the printed marks. For example, in some embodiments each row set includes a series of two or more rows of the printed marks formed by a single portion of the ejectors in the printhead 104A. The controller 128 forms the printed test pattern with multiple rows in each row set to reduce the effects of random drop placement errors in the identification of dispersions between the locations of printed marks in the cross-process direction.

Process 300 continues as the image sensor 116 generates scanned image data of the substrate and the first printed test pattern formed on the substrate (block 312). In the printer 100, the controller 128 receives the scanned image data from the image sensor 116. The controller 128 identifies the a first dispersion in the cross-process direction locations of the printed marks with reference to the cross-process direction locations and corresponding cross-process direction distances that separate the printed marks in the scanned image of the test pattern (block 316). As used herein, the term "dispersion" refers to differences in the cross-process direction locations between printed marks in scanned image data of the printed test pattern in comparison to the predetermined locations of the printed marks for a test pattern that is printed with ejectors that exhibit no deviation from the z-axis. For example, in FIG. 6 the test pattern 600 depicts an idealized arrangement of marks where the cross-process direction distance between adjacent marks is equal for each of the row sets 602A-602E. The printed test pattern 650 depicts scanned image data of marks that are printed with the printhead 104A. Since at least some of the ejectors in the printhead 104A eject material drops at varying angles along the cross-process direction other than the z-axis, the cross-process distances between adjacent printed marks in the row sets 652A-652E in the test pattern 650 exhibit dispersions compared to the test pattern 600.

In one embodiment, the controller 128 identifies the dispersions in the cross-process locations of the marks with reference to the standard deviation in the cross-process direction distances between marks compared to an average cross-process direction distance between the marks in the row sets of the printed test pattern. In one configuration, the controller 128 identifies the dispersion with reference to the average cross-process direction distance between marks empirically from the scanned image data of the printed test pattern (e.g. the average distance between marks in the scanned image data of the test pattern 650), and subsequently identifies the standard deviation with reference to the empirical average. In another configuration, the controller 128 uses the predetermined cross-process direction separation between marks in the predetermined test pattern (e.g. the cross-process direction separation between marks in the test pattern 600) as the average and identifies the standard deviation with reference to the predetermined average. In another configuration, the controller 128 identifies the standard deviation based on pairs of printed marks. The controller 128 identifies the standard deviation between the cross-process direction distance that separates adjacent printed marks in the test pattern and the average predetermined separation distance between the marks in the predetermined test pattern. In another configuration, the controller 128 identifies the average cross-process direction distance between adjacent groups of marks, and subsequently identifies the standard deviation with reference to the empirical average of the group to which each dash belongs.

The controller 128 identifies a dispersion, such as the standard deviation, for the cross-process distances between the printed marks in the scanned image data of each row set in the printed test pattern. In another embodiment, the printer 100 forms the printed test pattern during multiple passes of the support member 102 through the print zone. When the printer 100 prints different rows of marks in the test pattern during different passes, the dispersion for individual row sets in the scanned image data of each pass includes an artifact since only a portion of the ejectors in the printhead 104A forms each row of the printed test pattern. Because the ejection angle in the cross process direction for each ejector is random, and each row samples a different subset of the ejectors, the dispersion between rows is often unequal. For example, if printer forms the marks in row sets 652A and 652C when the printhead to support member spacing was at the same fixed distance, the standard deviation metric for row set 652A could differ from the standard deviation metric for row set 652C.

In a single-pass embodiment, the printer 100 forms the row sets in the printed test pattern with process direction spaces formed between the different row sets to enable the image sensor 116 to generate scanned image data of different row sets that are formed on the substrate. In a multi-pass configuration of the printer 100, the standard deviation or other dispersion metric experiences variations between passes of the support member 102 through the print zone 110. In either embodiment, the printer 100 identifies the standard deviation from sets of generated image data that include a periodic signal. A frequency of the periodic signal depends on either the relative process direction spacing between repeated sets of marks formed by the ejectors in the printhead on the substrate or upon a pass number in a multi-pass configuration. The periodic signal includes an artifact that is introduced due to the dependence of the standard deviation metric on the particular row since different rows have somewhat different standard deviation metrics. The regular repetition of rows in the generated image data of one or more test patterns introduces the artifact signal into the standard deviation metric signal. In some embodiments, the controller 128 applies a notch filter to the dispersion results from each row to generate a filtered plurality of dispersions from the dispersions identified for each of the row sets in the image data. The controller 128 applies the notch filter with a center frequency corresponding to the predetermined number of row sets in the first predetermined test pattern, such as five row sets in the illustrative test patterns 600 and 650 of FIG. 6.

Process 300 continues as the printer 100 adjusts the controller 128 operates one or both of the printhead actuator 120A and support member actuator 124 to move the printhead 104A and substrate by a predetermined distance along the z-axis to a second position with a second separation distance along the z-axis (block 320). The controller 128 operates the printhead 104A to form a second predetermined printed test pattern in the second position (block 324), generates second scanned image data of the second printed test pattern with the image sensor 116 (block 328), and identifies a second dispersion in the cross-process direction distances between marks in the second scanned image data (block 332). The printer 100 performs the processing of blocks 324-332 in substantially the same manner as the processing of blocks 308-316, respectively. During process 300, the controller 128 identifies a different second dispersion for the cross-process direction distances between printed marks in the second test pattern in comparison to the first dispersion of the first test pattern because the printer 100 adjusts the z-axis distance between the printhead 104A and the substrate. For example, if the printer 100 increases the z-axis distance between the printhead 104A and the substrate in the second position, then the dispersion level increases because the drops of ejected material from the printhead travel for a longer linear distance to the surface of the substrate. If, however, the second position has a shorter z-axis distance than the first position, then the dispersion decreases because the drops of ejected material from the printhead travel for a shorter linear distance to the surface of the substrate.

As depicted in FIG. 2, the level of dispersion between the locations of printed material drops and marks on the substrate surface 202 increases as the z-axis distance between the printhead 104A and the substrate 202 increases. In the embodiment of FIG. 2, the material drops travel along relatively linear paths after emission from the ejectors in the printhead 104A. Due to manufacturing dispersions in the printhead 104A, at least some of the ejectors emit the material drops with an angle in the cross-process direction, and the material drops do not follow a path that is parallel to the z-axis to reach the substrate 202. For example, the ejectors 220, 224, 226, and 228 emit material drops at an angle that is not parallel to the z-axis.

As depicted in FIG. 2, the level of dispersion between the cross-process direction locations of the drops of material ejected from the printhead 104A increases as the z-axis distance between the printhead 104A and the substrate 202 increases. In practical operation, the ejected material drops travel along substantially linear paths between the printhead 104A and the substrate 202. Thus, the degree of drop position dispersion along the cross-process direction axis CP for material drops from a given ejector increases as the z-axis direction distance between the printhead 104A and the substrate 202 increases. In the first position 240, the drops 250 and 252 that are emitted from the ejectors 220 and 224, respectively, land on positions that are closer together in the cross-process direction than the nominal cross-process direction distance between adjacent printed marks when both ejectors emit material drops in parallel with the z-axis. Other ejectors, such as the ejectors 226 and 228 emit the material drops 254 and 256, respectively, which land farther apart in the cross-process direction axis than the nominal cross-process direction separation between adjacent printed marks when both ejectors emit material drops in parallel with the z-axis. In the second position 244, the same types of dispersion in cross-process direction drop placement occur, but the degree of dispersion increases due to the longer z-axis distance between the printhead 104A and the substrate 202. For example, the material drops 260 and 262 are closer together than the corresponding drops 250 and 252 in the first position 240, while the material drops 264 and 266 are farther apart than the corresponding drops 254 and 256 in the first position 240. The precise dispersion in material drop placement depends upon the characteristics of each printhead and the process 300 identifies the dispersion empirically.

Referring again to FIG. 3, process 300 continues as the controller 128 generates a profile for the printhead 104A including a relationship between the between z-axis distance and the first and second dispersions in cross-process direction distances between printed marks and the predetermined z-axis distance between the first position and the second position (block 336). In one embodiment, the controller 128 identifies the relationship as a linear relationship between the first and second dispersion levels on one axis and the predetermined displacement distance along the z-axis between the first and second positions along another axis. The controller 128 stores the generated profile in the memory 132 with the drop dispersion to z-axis distance profile data 144 in association with the printhead 104A.

FIG. 7 depicts a graph 700 of an example of a printhead profile relationship. The graph 700 includes the line 732 that fits the rise 728 corresponding to the predetermined change in the printhead and substrate distances and the run 730 corresponding to the change in identified cross-process direction drop placement dispersions between the first position dispersion 720 and the second position dispersion 724. The graph 700 also includes additional identified dispersion levels that are generated at different z-axis distances between the printhead and the substrate, and the controller 128 generates the linear relationship 732 as a best-fit line through the different dispersion levels. While FIG. 7 depicts a linear relationship for the printhead profile, alternative profile embodiments can include curves, splines, or other relationships between the cross-process direction dispersion levels and z-axis distance.

In some embodiments, either or both of the first position and second position along the z-axis are at a predetermined measured distance (e.g. 0.5 mm and 1 mm) between the printhead and the substrate. In these embodiments, the controller 128 can use the profile data to identify an absolute distance between the printhead 104A and the substrate, and identify if the z-axis distance is too small or too great for printing operations. However, the printer 100 can generate the profile without absolute z-axis distance measurements between the printhead and the substrate surface. Instead, the controller 128 generates the profile with a known z-axis displacement between the first position and the second position of the printhead and substrate along the z-axis. The controller 128 uses the profile corresponding to the relative z-axis distance between the printhead and the substrate to identify if the printhead is too close or too far from the substrate along the z-axis.

As described above, the process 300 generates a profile to identify the z-axis distance between a printhead and a substrate in the three-dimensional object printer based on changes in the dispersion of cross-process material drop placement at different z-axis distances between the printhead and the substrate. In some embodiments, the printer 100 performs the process 300 for each of the printheads 104A-104C and 108A-108C to identify profiles for each printhead since the dispersions in cross-process direction drop placement depend upon individual dispersions in the manufacture of each printhead. In other embodiments, the differences in the dispersion levels between different printheads are small compared to the sensitivity of the measurement needed, and the printer 100 uses a profile that is generated for a single printhead to identify the z-axis distances between the substrate and each of the printheads 104A-104C and 106A-106C. While process 100 describes placement of the printhead and substrate in two positions with two different separation distances along the z-axis, alternative embodiments of the process 300 form the predetermined test pattern at three or more z-axis positions to generate the profile.

Figure 4:
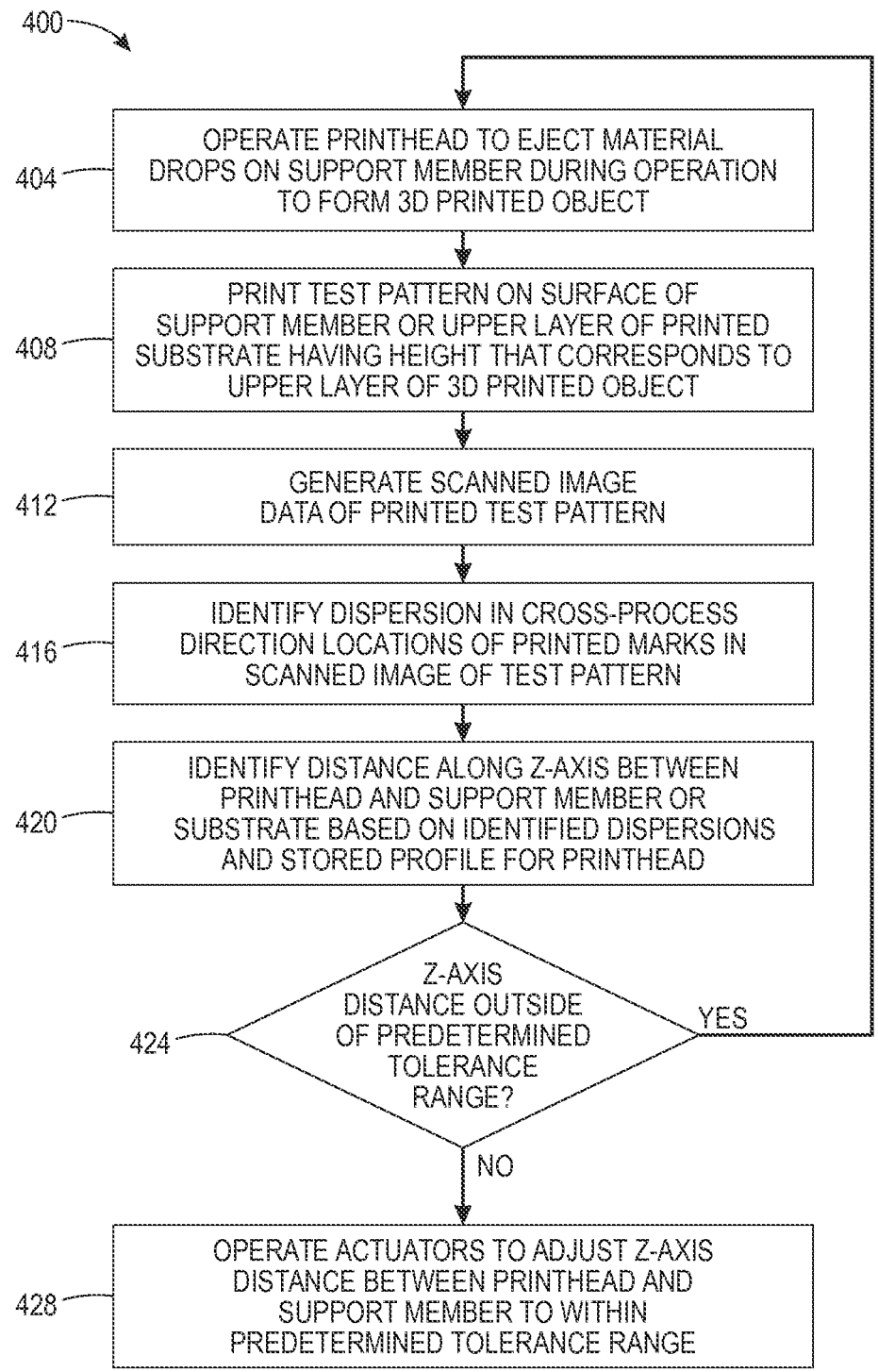
FIG. 4 is a block diagram of a process for identifying a z-axis distance between a printhead and a substrate in a three-dimensional object printer.

FIG. 4 depicts a block diagram of a process 400 for identification of a distance between a printhead and a substrate along a z-axis in a three-dimensional object printer. In the description below, a reference to the process 400 performing an action or function refers to the operation of a controller in a printer to execute stored program instructions to perform the function or action with other components in the printer. The process 400 is described in conjunction with the printer 100 and FIG. 1B for illustrative purposes. The process 400 is described in conjunction with the printhead 104A for illustrative purposes, but the printer 100 performs the same process for some or all of the printheads 104A-104C and 108A-108C.

Process 400 begins as the controller 128 operates the printhead 104A to form a three-dimensional printed object (block 404). During operation in the printer 100, the controller 128 operates the printhead 104A and the other printheads 104B-104C and 108A-108C to form a printed object, such as the printed object 150 that is depicted in FIG. 1B. During the printing process, the controller 128 operates the ejectors in the printhead 104A to form the predetermined printed test pattern on the surface of the support member 102, such as the test patterns 184, or another substrate formed on the support member 102 (block 408). In the example of FIG. 1B, the upper layer of the object 150 forms a substrate using an optically distinct material from the printheads 108A-108C to form a surface that contrasts with the printed test pattern 186 from the printhead 104A. In other embodiments, the printheads 104A-104C and 108A-108C form separate substrate structures that correspond to the height of the three-dimensional printed object along the z-axis. During process 400 the controller 128 operates the ejectors in the first printhead 104A to form either the same test pattern that is formed during the process 300 or another test pattern that includes row sets with the same relative cross-process direction spacing between marks in the test pattern.

The process 400 continues as the printer 100 generates scanned image data of the printed test patterns with the image sensor 116 (block 412) and the controller 128 identifies dispersions in the cross-process direction locations of the printed marks in the test pattern with reference to the scanned image data (block 416). The controller 128 performs the processing of blocks 412 and 416 in a similar manner to the test pattern scanning and dispersion identification described above in blocks 312 and 316, respectively, or 324 and 328, respectively, in the process 300.

During process 400, the controller 128 uses the identified dispersion in the cross-process direction locations of marks in the printed test pattern and the dispersion to z-axis distance profile data 144 stored in the memory 132 to identify the z-axis distance between the printhead 104A and the substrate (block 420). As described above with regards to FIG. 7, the controller 128 uses the previously generated linear relationship to identify a distance along the z-axis distance between the printhead 104A and the substrate, such as the support member 102 or the upper layer of the object 150. If the identified z-axis distance between the printhead and the substrate is within a predetermined tolerance range (block 424) then the printer 100 continues to use the printhead 104A to form the three-dimensional printed object and the controller 128 optionally performs the process 400 again at a later stage of the printing process. If, however, the z-axis distance between the printhead 104A and the substrate is either too small or too large, then the controller 128 operates either or both of the actuators 120A and 124 to adjust the z-axis distance between the printhead 104A and the substrate to be within the predetermined tolerance range (block 428). For example, in the embodiment of the printer 100 the acceptable z-axis distance is in a range of approximately 0.4 mm to 3.0 mm, although the z-axis distance varies for different three-dimensional object printer embodiments.

Figure 5A:
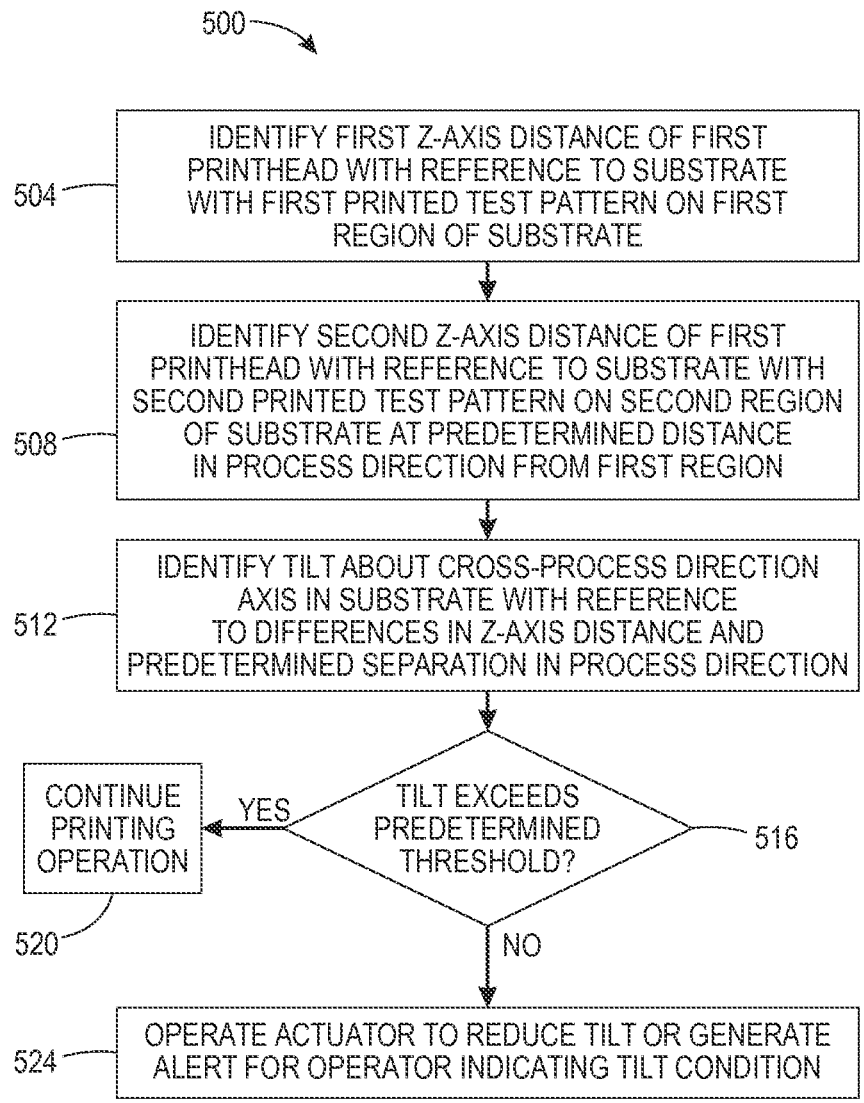
FIG. 5A is a block diagram of a process for identifying tilt of a substrate in a three-dimensional object printer.
Figure 5B:
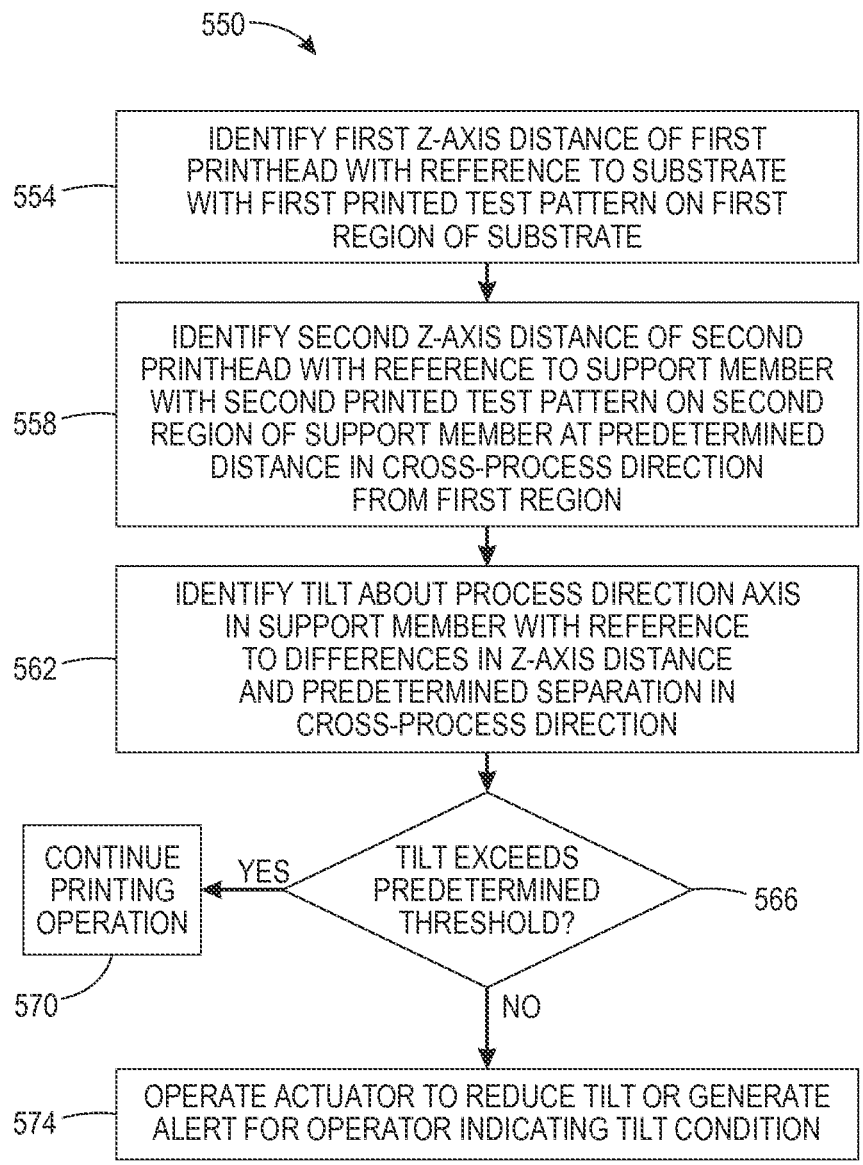
FIG. 5B is a block diagram of another process for identifying tilt of a substrate in a three-dimensional object printer.

The process 400 described above enables the printer 100 to identify a z-axis distance between a printhead and a single region of the substrate that includes the printed test pattern. In some instances, however, the substrate, such as the support member 102 or a three-dimensional printed structure supported by the substrate 102, experiences tilt away from an angle that is parallel to the faces of the printheads 104A-104C and 108A-108C in the printer 100. The tilt in the substrate can produce errors in the printed three-dimensional object, and FIG. 5A and FIG. 5B depict processes 500 and 550, respectively, which identify and correct substrate tilt in the printer 100. In the description below, a reference to the processes 500 or 550 performing an action or function refers to the operation of a controller in a printer to execute stored program instructions to perform the function or action with other components in the printer. The processes 500 and 550 are described in conjunction with the printer 100 and FIG. 1A-FIG. 1B for illustrative purposes.

FIG. 5A depicts a process 500 for identification of tilt about the cross-process direction axis CP. For example, in FIG. 1A and FIG. 1B, the arrows 172 and 174 depict potential tilt of the support member 102 about the cross-process direction axis CP. The tilt produces a slope of the support member 102 and a corresponding change in the z-axis distance between the support member 102 and the printheads 104A-104C and 108A-108C along the length of the process direction axis P.

During process 500, the printer 100 identifies the z-axis distance between at least one printhead, such as the printhead 104A, and the substrate, such as the support member 102, in a first region of the substrate (block 504). The printer 100 identifies first the z-axis distance to the first region of the support member 102 using the process 400 and the stored profile data 144 associated with the printhead 104A that is generated during the process 300. The printhead 104A generates a printed test pattern on a first region of the substrate 102, such as the printed test patter 192A formed on the support member 102 in FIG. 1A. The printer 100 also identifies the z-axis distance between the printhead 104A and the support member 102 in a second region of the support member that is separated from the first region by a predetermined distance in the process direction P (block 508). The printer 100 also identifies the z-axis distance to the second region of the support member using the process 400 and the stored profile data 144 associated the printhead 104A that is generated during the process 300. In FIG. 1A, the printhead 104A forms the printed test pattern 192B on a second region of the support member 102 that is separated from the first region including the first test pattern 192A by a predetermined distance in the process direction P.

During process 500, the controller 128 identifies an angle of tilt about the cross-process direction axis CP with reference to a difference between the first z-axis distance, the second z-axis distance and the predetermined process direction separation between the first region of the support member 102 including the first test pattern 192A and the second region of the support member 102 including the second test pattern 192B (block 512). For example, the controller 128 identifies a tilt angle θ with reference to the following equation:

$$\theta = \operatorname{atan}\left(\frac{z_1 - z_2}{D}\right)$$

where $z_1$ and $z_2$ are the first and second identified z-axis distances, respectively, and D is the predetermined process direction separation between the first and second printed test patterns. The value of θ indicates the magnitude of any tilt and the sign (positive or negative) indicates the direction of the tilt.

If the angle of identified tilt is zero or is sufficiently small to be within a predetermined operating threshold for the printer 100 (block 516) then the printer 100 continues three-dimensional object printing operations using the support member 102 (block 520). If, however, the identified tilt exceeds the predetermined threshold (block 516), then the controller 128 operates an actuator, such as the actuator 124 or another actuator that is operatively connected to the support member 102, to reduce or eliminate the identified tilt about the cross-process direction axis (block 524). The printer 100 continues with a printing operation with the support member 102. In an alternative embodiment, the printer 100 ceases operation and generates an output alert to an operator that indicates the tilt, and a manual realignment process realigns the support member 102 to reduce or eliminate the tilt.

The process 550 in FIG. 5B identifies a tilt of the substrate, such as the support member 102, about the process direction axis P with reference to changes in the z-axis distances between two regions of the support member 102 and two printheads in the printer 100, such as the printheads 104A and 104C. For example, in FIG. 1A and FIG. 1B, the arrows 176 and 178 depict potential tilt of the support member 102 about the process direction axis P. The tilt produces a slope of the support member 102 and a corresponding change in the z-axis distance between the support member 102 and the printheads 104A-104C and 108A-108C along the length of the cross-process direction axis CP.

During the process 550, the printer 100 identifies the z-axis distance between a first printhead, such as the printhead 104A, and the substrate, such as the support member 102, in a first region of the substrate (block 554). The printer 100 identifies first the z-axis distance to the first region of the support member 102 using the process 400 and the stored profile data 144 associated the printhead 104A that is generated during the process 300. The printhead 104A generates a printed test pattern on a first region of the substrate 102, such as the printed test patter 194A formed on the support member 102 in FIG. 1A. The printer 100 also identifies the z-axis distance between the second printhead 104C and the support member 102 in a second region of the support member that is separated from the first region by a predetermined distance in the cross-process direction CP (block 558). The printer 100 also identifies the z-axis distance to the second region of the support member using the process 400 and the stored profile data 144 associated the printhead 104C that is generated during the process 300. In FIG. 1A, the printhead 104C forms the printed test pattern 194B on a second region of the support member 102 that is separated from the first region including the first test pattern 194A by a predetermined distance in the cross-process direction CP.

In another embodiment, the printer 100 identifies two or more dispersion levels for different groups of marks that are formed from two or more sets of ejectors in a single printhead instead of using test patterns that are formed by two different printheads. For example, the test pattern 186 in FIG. 1B is formed from ejectors in a single printhead, but the controller 128 optionally identifies two different dispersion values for a first portion and a second portion of the printed marks in the test pattern 186. The first portion of the printed marks is separated from the second portion of the printed marks by a predetermined distance in the cross-process direction CP. In one embodiment, the controller 128 divides the image data of the printed marks in half along the process direction axis P to group the image data into two groups that are separated along the cross-process direction axis. The controller 128 identifies first and second dispersion values for the first and second groups of the marks. Examples of printers that use the single printhead embodiment of the process 550 include the printer 100 and in printers that include wider printheads including "full width" printheads where a single printhead extends across most or all of the cross-process direction width of the print-zone 110.

During process 550, the controller 128 identifies an angle tilt about the process direction axis P with reference to a difference between the first z-axis distance, the second z-axis distance and the predetermined cross-process direction separation between the first region of the support member 102 including the first test pattern 194A and the second region of the support member 102 including the second test pattern 194B (block 562). For example, the controller 128 identifies a tilt angle φ with reference to the following equation:

$$\phi = \operatorname{atan}\left(\frac{z_{p1} - z_{p2}}{C}\right)$$

where $z_{p1}$ is the z-axis distance between the first printhead 104A and the first region of the support member 102, $z_{p2}$ is the z-axis distance between the second printhead 104C and the second region of the support member 102, and C is the predetermined cross-process direction separation between the first and second printed test patterns or the predetermined cross-process direction separation between the two sections of a single test pattern used to extract the z-axis distance. The value of φ indicates the magnitude of any tilt and the sign (positive or negative) indicates the direction of the tilt.

If the angle of identified tilt is zero or is sufficiently small to be within a predetermined operating threshold for the printer 100 (block 566) then the printer 100 continues three-dimensional object printing operations using the support member 102 (block 570). If, however, the identified tilt exceeds the predetermined threshold (block 566), then the controller 128 operates an actuator, such as the actuator 124 or another actuator that is operatively connected to the support member 102, to reduce or eliminate the identified tilt about the cross-process direction axis (block 574). The printer 100 continues with a printing operation with the support member 102. In an alternative embodiment, the printer 100 ceases operation and generates an output signal to an operator that indicates the tilt, and a manual realignment process realigns the support member 102 to reduce or eliminate the tilt.

It will be appreciated that variants of the above-disclosed and other features and functions, or alternatives thereof, may be desirably combined into many other different systems, applications or methods. Various presently unforeseen or unanticipated alternatives, modifications, dispersions or improvements may be subsequently made by those skilled in the art that are also intended to be encompassed by the following claims.

What is claimed:

1. A method of operating a three-dimensional object printer, the method comprising:
   operating a plurality of ejectors in a first printhead to form a first predetermined test pattern having a first plurality of marks arranged in a cross-process direction on a surface of a substrate on a support member;
   generating with an image sensor image data of the first predetermined test pattern on the substrate on the support member;
   identifying with a controller a dispersion of cross-process direction distances between marks of the first plurality of marks of the first predetermined test pattern using the generated image data;
   identifying with the controller a first z-axis distance between the first printhead and the substrate on the support member using the identified dispersion of cross-process direction distances between marks of the first plurality of marks of the first predetermined test pattern and a predetermined profile stored in a memory, the predetermined profile including a relationship between a range of z-axis distances between the first printhead and the substrate on the support member and corresponding dispersions of cross-process direction distances between marks in printed test patterns formed over the range of z-axis distances, the z-axis being perpendicular to the surface of the substrate on the support member;
   detecting with the controller that the identified first z-axis distance is outside of a predetermined z-axis distance range; and
   operating with the controller at least one actuator to move at least one of the first printhead and the substrate on the support member along the z-axis to bring a distance between the first printhead and the substrate on the support member within the predetermined z-axis distance range, wherein the formation of the first predetermined test pattern further comprises operating the first printhead to form the first predetermined test pattern with the plurality of marks arranged in a predetermined number of row sets, each of the row sets having marks printed by a portion of the ejectors in the first printhead that are separated from each other in the cross-process direction by at least one other ejector in the first printhead.

2. The method of claim 1 further comprising:
   operating the plurality of ejectors in the first printhead to form a second predetermined test pattern having a second plurality of marks arranged in the cross-process direction on a region of the surface of the substrate on the support member that is separated by a predetermined distance in a process direction from a region of the surface of the substrate on the support member containing the first predetermined test pattern;
   generating with the image sensor image data that includes the second predetermined test pattern on the substrate on the support member;
   identifying with the controller another dispersion of cross-process direction distances between marks in the second plurality of marks of the second predetermined test pattern using the generated image data;

identifying with the controller a second z-axis distance between the first printhead and the region of the surface of the substrate containing the second predetermined test pattern using the identified other dispersion and the predetermined profile; and identifying with the controller an angle of tilt of the substrate with reference to a difference between the first z-axis distance, the second z-axis distance, and the predetermined distance of separation in the process direction between the first predetermined test pattern and the second predetermined test pattern.

3. The method of claim 2, wherein the controller is configured to operate the at least one actuator to reduce the angle of tilt only when the identified angle of tilt exceeds a predetermined threshold therefor.

4. The method of claim 1 further comprising:

operating a plurality of ejectors in a second printhead to form a second predetermined test pattern having a second plurality of marks arranged in the cross-process direction on a region of the surface of the substrate on the support member that is separated by a predetermined distance in the cross-process direction from a region of the surface of the substrate on the support member containing the first predetermined test pattern;

generating with the image sensor image data that includes the second predetermined test pattern on the substrate on the support member;

identifying with the controller a dispersion of cross-process direction distances between marks of the second plurality of marks of the second predetermined test pattern using the generated image data;

identifying with the controller a second z-axis distance between the second printhead and the region of the surface of the substrate on the support member containing the second predetermined test pattern using the identified dispersion of cross-process direction distances between marks of the second plurality of marks of the second predetermined test pattern and the predetermined profile stored in the memory; and identifying with the controller an angle of tilt of the substrate on the support member using a difference between the first z-axis distance, the second z-axis distance, and the predetermined distance of separation in the cross-process direction between the first predetermined test pattern and the second predetermined test pattern.

5. The method of claim 4 further comprising:

detecting with the controller that the identified angle of tilt exceeds a predetermined threshold; and operating with the controller the at least one actuator to reduce the angle of tilt to be less than the predetermined threshold.

6. The method of claim 1 further comprising:

identifying with the controller a first dispersion of cross-process direction distances between marks in only a first portion of the first plurality of marks of the first predetermined test pattern using the generated image data;

identifying with the controller a second dispersion of cross-process direction distances between marks in only a second portion of the first plurality of marks of the first predetermined test pattern using the generated image data, the second portion of the first plurality of marks being separated from the first portion of the first plurality of marks by a predetermined distance in the cross-process direction;

identifying with the controller the first z-axis distance between a first portion of the first printhead and the substrate on the support member using the first dispersion;

identifying with the controller a second z-axis distance between a second portion of the first printhead and the substrate on the support member using the second dispersion;

identifying with the controller an angle of tilt of the substrate on the support member using a difference between the first z-axis distance, the second z-axis distance, and the predetermined distance of separation in the cross-process direction between the first portion of the first predetermined test pattern and the second portion of the first predetermined test pattern.

7. The method of claim 1, wherein the operation of the first printhead to form the first predetermined test pattern on the surface of the substrate on the support member forms the first predetermined test pattern on a surface of one of a build material structure and a support material structure that extends in the z-axis from a surface of the support member.

8. The method of claim 1, the identification of the dispersion of cross-process direction distances between marks of the first predetermined test pattern further comprising:

identifying with the controller a plurality of cross-process direction distances between adjacent marks of the plurality of marks in the generated image data; and identifying with the controller the dispersion of cross-process direction distances between marks of the first predetermined test pattern using a standard deviation of the plurality of cross-process direction distances between the adjacent marks of the plurality of marks in the generated image data.

9. The method of claim 1, the identification of the dispersion of cross-process direction distances between marks of the first predetermined test pattern further comprising:

identifying with the controller a plurality of dispersions corresponding to cross-direction distances between marks in each row set in the plurality of row sets;

generating with the controller a filtered plurality of dispersions with a notch filter and the plurality of dispersions, a frequency of the notch filter corresponding to the predetermined number of row sets in the first predetermined test pattern; and identifying with the controller the dispersion for the first predetermined test pattern using the filtered plurality of dispersions.

* * * * *